US012378797B2

(12) United States Patent
Plourde

(10) Patent No.: US 12,378,797 B2
(45) Date of Patent: Aug. 5, 2025

(54) MAGNETICALLY RESISTANT SOLENOID ACTIVATED LOCK RELEASE FOR USE IN A LOCKING DEVICE

(71) Applicant: Santa Cruz Gunlocks, LLC, Webster, NH (US)

(72) Inventor: Christopher Plourde, Webster, NH (US)

(73) Assignee: Santa Cruz Gunlocks, LLC, Webster, NH (US)

( * ) Notice: Subject to any disclaimer, the term of this patent is extended or adjusted under 35 U.S.C. 154(b) by 18 days.

(21) Appl. No.: 18/299,468

(22) Filed: Apr. 12, 2023

(65) Prior Publication Data

US 2024/0344359 A1 Oct. 17, 2024

(51) Int. Cl.
*E05B 47/00* (2006.01)
*E05B 73/00* (2006.01)

(52) U.S. Cl.
CPC .......... *E05B 47/0002* (2013.01); *E05B 73/00* (2013.01); *E05B 2047/0016* (2013.01)

(58) Field of Classification Search
CPC .. E05B 47/00; E05B 47/0002; E05B 47/0003; E05B 47/0004; E05B 2047/0014; E05B 2047/0015; E05B 2047/0016; E05B 73/00
USPC .......................................................... 70/277
See application file for complete search history.

(56) References Cited

U.S. PATENT DOCUMENTS

| | | | | |
|---|---|---|---|---|
| 4,354,189 A * | 10/1982 | Lemelson | F41A 17/063 | 340/10.5 |
| 5,303,495 A * | 4/1994 | Harthcock | F41A 17/06 | 42/70.11 |
| 6,282,829 B1 * | 9/2001 | Mossberg | F41A 17/063 | 42/70.11 |
| 9,791,230 B2 * | 10/2017 | Plourde | F41A 17/063 | |
| 9,891,015 B2 * | 2/2018 | Plourde | F41A 17/063 | |
| 2002/0032976 A1 * | 3/2002 | Riener | F41A 17/063 | 42/70.11 |
| 2012/0291327 A1 * | 11/2012 | Boutot, Jr. | F41C 33/06 | 42/70.11 |
| 2015/0033810 A1 * | 2/2015 | Zalavari | A47B 81/00 | 70/266 |
| 2015/0184428 A1 * | 7/2015 | Zalavari | A47B 81/00 | 70/2 |

(Continued)

*Primary Examiner* — Nathan Cumar
(74) *Attorney, Agent, or Firm* — Hinckley Allen & Snyder

(57) ABSTRACT

An electromechanical locking mechanism includes a solenoid coupled to a source of electrical energy which energizes the solenoid. The solenoid includes a central cavity having a predetermined diameter and length. A spring is provided which is sized and configured for being disposed within the central cavity of the solenoid. A magnetic field resistant solenoid activated locking element comprises a first locking element portion, configured for engaging with an opening in a locking device and manufactured of a non-magnetically conductive material, and a second locking element portion, mechanically coupled to the first locking element portion and configured for being disposed in the central cavity of the solenoid abutting the spring, and manufactured of a magnetically conductive material. In another embodiment, a metal solenoid enclosure is provided with an electromagnetic shield around a solenoid and comprises a bottom plate, at least first and second side plates, and a top plate.

18 Claims, 6 Drawing Sheets

(56) References Cited

U.S. PATENT DOCUMENTS

| | | | | |
|---|---|---|---|---|
| 2015/0260480 A1* | 9/2015 | Dunn | E05G 1/00 | 42/70.11 |
| 2016/0054080 A1* | 2/2016 | Haimi | F41A 17/54 | 70/263 |
| 2016/0054083 A1* | 2/2016 | Kiyani | F41A 17/066 | 42/70.11 |
| 2016/0327355 A1* | 11/2016 | Zalavari | F41A 17/02 | |

* cited by examiner

MAGNETICALLY RESISTANT SOLENOID ACTIVATED LOCK RELEASE FOR USE IN A LOCKING DEVICE

TECHNICAL FIELD

The present invention relates to a solenoid operated locking device release mechanism utilizing a solenoid driven locking pin, such as used for example in a gunlock, and more particularly, relates to a magnetically resistant solenoid activated locking element used to release a locking device such as a gunlock and to a magnetic shield for a solenoid used in such devices, for preventing the unauthorized opening of the locking device using a magnet to activate the solenoid activated locking pin.

BACKGROUND INFORMATION

Certain law enforcement, corrections, military, and civilian applications often require that firearms be secured (i.e. locked) in a non-enclosed, readily accessible manner, ready to be rapidly unlocked, released from the locking mechanism and used.

There is an abundance of different types of firearms that one could potentially secure in such a gunlock including rifles, shotguns and the like. All of these firearms differ in size, brand, structural and functional design, etc. In addition to the diversity of different firearms that must be compatible with these weapon gunlocks, creating a system for securing modern firearms is made harder by a flood of tactical accessories that are available to be mounted on these firearms. By way of example, there are a wide variety of optics, lights, lasers, grips, stocks, and other tactical accessories that can be purchased and equipped on modern weapons. This abundance of different tactical accessories often makes securing the weapons outfitted with such tactical accessory (ies) difficult so that in some instances in the prior art, specialized gunlocks are required for each variation of weapon and/or accessories.

Solenoid activated "clamshell" style gunlocks are commonly used in various situations to secure these types of weapons. Examples of prior art clamshell locks include the Tufloc® brand small shotgun lock manufactured by Esmet Inc. of Canton Ohio and the SC-1 manufactured by Santa Cruz Gunlocks LLC of Webster, NH, both of which are incorporated herein by reference.

In addition to weapons, tools, particularly expensive tools, are also often secured when not in use by some form of solenoid activated locking device.

Many if not most of such prior art clamshell gunlocks, as well as several other types of gunlocks and/or other solenoid activated locking devices, have an electronic unlocking mechanism which utilizes a solenoid to activate (i.e retract) a spring-loaded pin placed in a portion of the gunlock. The pin is spring loaded and normally in the extended or locked position. When locked, the pin engages an opening in the gunlock or other locking device. Activating the solenoid causes the pin to be retracted, allowing the gunlock or other locking device to open.

Unfortunately, the use of a solenoid activated lock has deficiencies as well. Specifically, when a magnet, such as a rare earth magnet or electromagnet for example, of a sufficient size/strength is placed proximate the gunlock in the area of the solenoid, the magnetic force from the magnet will activate the solenoid, retracting the pin and causing the gunlock to be able to be opened. This action allows for unauthorized access to the weapon thought to be safely locked and stored in the gunlock.

Accordingly, what is needed is a locking mechanism and locking mechanism shield for clam shell style gunlocks as well as any solenoid operated lock that will resist or prevent unintended opening using a magnet or other magnetic field generating element against or near the locking mechanism release activated solenoid.

SUMMARY OF THE INVENTION

It is therefore a feature and object of the present invention to overcome various shortcomings and drawbacks associated with the prior art. One advantageous feature of the gunlock device of the present invention is to provide an electromechanical locking mechanism, including a magnetic field resistant solenoid activated locking element, the electromechanical locking mechanism including a solenoid, coupled to a source of electrical energy, and configured for electrically energizing the solenoid, the solenoid including a central a cavity having predetermined diameter and length.

The electromechanical locking mechanism includes a spring, sized and configured for being inserted into and disposed within the central cavity of the solenoid. The spring has a predetermined diameter which is less than the predetermined diameter of the central cavity of the solenoid, and a length which is less than the predetermined length of the central cavity of the solenoid. In one embodiment, the solenoid may include a magnetic shield around four sides and a bottom region of the solenoid.

The invention further includes a magnetic field resistant solenoid activated locking element comprising a first locking element portion, configured for engaging with an opening in a locking device and manufactured of a non-magnetically conductive material, and a second locking element portion, mechanically coupled to the first locking element portion, and configured for being disposed in the central cavity of the solenoid abutting the spring, and manufactured of a magnetically conductive material.

In the preferred embodiment, source of electrical energy is interruptible and wherein the solenoid is operable between an energized state when the source of electrical energy is not interrupted to the solenoid and a non-energized state when the source of electrical energy is interrupted to the solenoid. In the non-energized state, the spring is configured for pushing against the magnetic field resistant solenoid activated locking element forcing the first locking element portion to engage with the opening in the locking device. In an energized state, the solenoid creates an electrical field causing the second locking element portion to be pulled downwardly into the central cavity of the solenoid against the spring, causing the first locking element portion to become disengaged with the opening in the locking device.

The first locking element portion is, in one embodiment, manufactured of a non-magnetically conductive material, which material may be selected, for example, from the group of materials including aluminum, plastic, fiber reinforced plastic and composite materials. The second locking element portion is, in one embodiment, preferably manufactured from a magnetically attracted material such as steel.

In the preferred embodiment, the first locking element portion includes a first end configured for engaging with the opening in the locking device, and a second end is configured for engaging with the second locking element portion. The second end of the first locking element portion preferably includes a slot, and wherein the second locking element portion includes a pin disposed in a first end and configured for engaging with the slot in the second end of the first locking element portion. The second locking element portion preferably includes a second end having a predetermined diameter which is less than the predetermined diameter of the spring and configured for engaging the second and of the second locking element portion with the spring.

In a preferred embodiment of the present invention, the locking device includes a gunlock and may further and more specifically be a clamshell style gunlock.

In another embodiment, the invention includes an electromechanical locking mechanism having a magnetic shield or enclosure around at least two sides and a top and bottom region of the solenoid. The magnetic shield or enclosure comprises a metal solenoid enclosure including a bottom plate, at least first and second side plates, and a top plate. The bottom, top and at least first and second side plates are configured for forming a magnetic field shield around the solenoid, for preventing an externally applied magnetic field from acting on the solenoid and causing the solenoid to move from one of a first or second position to the other of the first or second position.

In one embodiment, the bottom plate includes a predetermined distance between one edge of the bottom plate closest to an outside region of a locking device wherein is disposed the solenoid and the at least first and second side and the top plate such that the predetermined distance wherein is disposed the solenoid and the at least first and second side and the top plate is selected to ensure that any magnetic field applied from proximate the outside region of the locking device proximate the one edge of the bottom plate will be insufficient to energize the solenoid causing the solenoid to move from one of the first or second position to the other of the first or second position preventing unintentional and unauthorized activation of the solenoid.

In another embodiment, the invention features a metal solenoid enclosure, configured for providing an electromagnetic shield around a solenoid coupled to a source of energy, and selectively energizable from a first position to a second position. The metal solenoid enclosure is configured for preventing unintentional and unauthorized activation of the solenoid and a locking mechanism, coupled to and selectively activated by the solenoid. The locking mechanism is configured for being moved from a first locked position to a second unlocked position.

The metal solenoid enclosure comprises a bottom plate, at least first and second side plates, and a top plate. The bottom, top and at least first and second side plates are configured for forming a magnetic field shield around the solenoid, for preventing an externally applied magnetic field from acting on the solenoid and causing the solenoid to move from one of the first or second position to the other of the first or second position.

In this embodiment, the bottom plate may include a predetermined distance between one edge of the bottom plate closest to an outside region of a locking device wherein is disposed the solenoid and the at least first and second side and the top plate such that the predetermined distance wherein is disposed the solenoid and the at least first and second side and the top plate is selected to ensure that any magnetic field applied from proximate the outside region of the locking device proximate the one edge of the bottom plate will be insufficient to energize the solenoid and cause the solenoid to move from one of the first or second position to the other of the first or second position preventing unintentional and unauthorized activation of the solenoid.

Another embodiment of the present invention includes a solenoid activated locking device including a metal solenoid enclosure. The metal solenoid enclosure is configured for providing an electromagnetic shield around a solenoid and is configured for preventing unintentional and unauthorized activation of the solenoid.

The solenoid activated locking device comprises a solenoid, coupled to a source of energy, and selectively energizable from a first position to a second position. A locking mechanism is provided which is coupled to and selectively activated by the solenoid. The locking mechanism is configured for being moved from a first locked position to a second unlocked position. A metal solenoid enclosure is provided and configured for providing an electromagnetic shield around a solenoid. The metal solenoid shield includes a bottom plate, at least first and second side plates, and a top plate. The bottom, top and at least first and second side plates are configured for collectively forming a magnetic field shield around the solenoid, for preventing an externally applied magnetic field from acting on the solenoid and causing the solenoid to move from one of the first or second position to the other of the first or second position.

The bottom plate in this embodiment may include a predetermined distance between one edge of the bottom plate closest to an outside region of a locking device wherein is disposed the solenoid and the at least first and second side and the top plate such that the predetermined distance wherein is disposed the solenoid and the at least first and second side and the top plate is selected to ensure that any magnetic field applied from proximate the outside region of the locking device proximate the one edge of the bottom plate will be insufficient to energize the solenoid causing the solenoid to move from one of the first or second position to the other of the first or second position preventing unintentional and unauthorized activation of the solenoid.

BRIEF DESCRIPTION OF THE DRAWINGS

These and other features and advantages of the present invention will be better understood by reading the following detailed description, taken together with the drawings of one embodiment of the invention wherein.

DETAILED DESCRIPTION OF THE PREFERRED EMBODIMENTS

The following detailed description is provided relative to an exemplary embodiment of the present invention for a magnetically resistant solenoid activated lock release for use in a locking device which serves to overcome various disadvantages in the prior art.

Although the present invention will be explained in the context of a clamshell gunlock, the exemplary embodiment is not exclusive nor exhaustive of all possible embodiments and uses for the present invention. Specifically, the magnetically resistant solenoid activated lock release for use in a locking device of the present invention provides a satisfactory solution for clamshell gunlocks for those persons who wish to secure their firearm in the above described 'ready' state without sacrificing a quality of safety against unauthorized electromagnetic opening as well as other gunlocks and other solenoid operated locking devices of any type and for any product.

Figure 1:
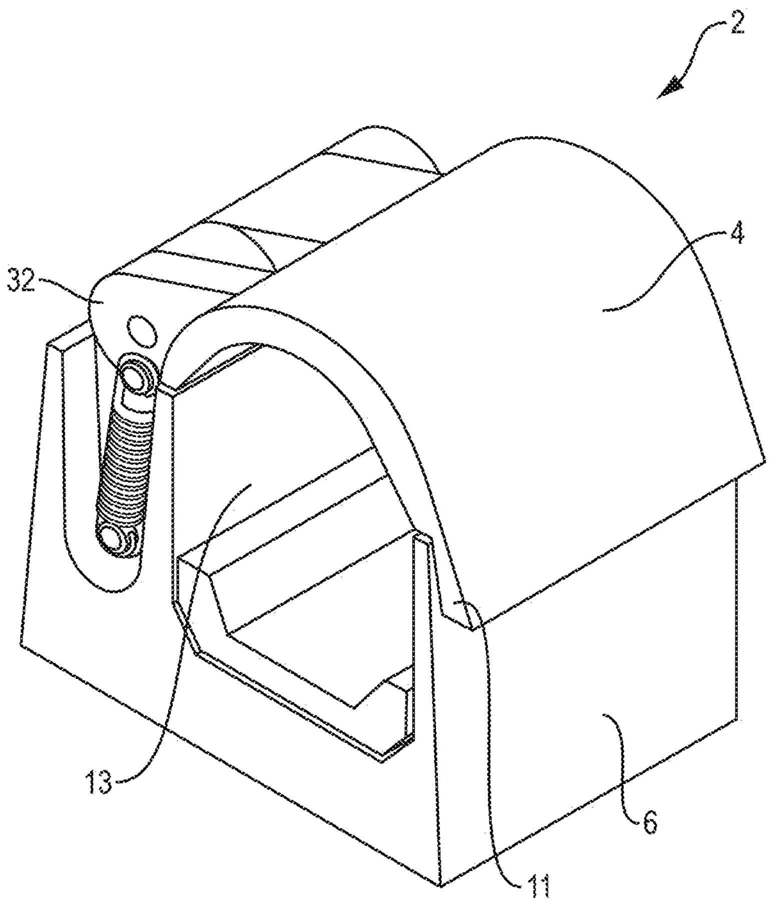
FIG. 1 (PRIOR ART)
FIG. 1 is a perspective view of a prior art clamshell gunlock in a closed position.

The present invention is illustrated and described in connection with, for exemplary purposes only, a clamshell style gunlock device 2, FIG. 1, having a hingeable top portion 4 and a bottom portion/casting 6 which are maintained in a closed position vis-à-vis one another when in a locked position as shown in FIG. 1 and creating a cavity 13 which surrounds a weapon once the gunlock device 2 is closed and secured.

In this example, the top portion 4 and body portion 6 interlock in an overlapping fashion along the front edge 11 of the gunlock 2 which provides a strong mechanical connection between the top and bottom components 4/6 of the gunlock. The basic components, construction and operation of the exemplary clamshell style gunlock are well known in the industry and are incorporated herein by reference.

The top portion 4 and bottom portion 6 engage at two points: along hinge 32 and along a front edge 11. The top portion 4 rotates about the hinge 32 such that the gunlock device 2 opens (FIG. 2) and closes (FIG. 1) in a clamshell fashion. When in an open position, the top portion 4 pivots or rotates about axis 51. When in a closed position, the top portion 4 and body portion 6 engage at two points, providing a strong mechanical connection between the two components 4, 6 of the gunlock device 2. That is, in this embodiment illustrating a clamshell style gunlock, the solid physical connection along the front edge 11 and the pivot or hinge 32 between the body portion 6 and top portion 4 are sufficiently strong enough to ensure that the gunlock can retain the firearm securely.

Figure 2:
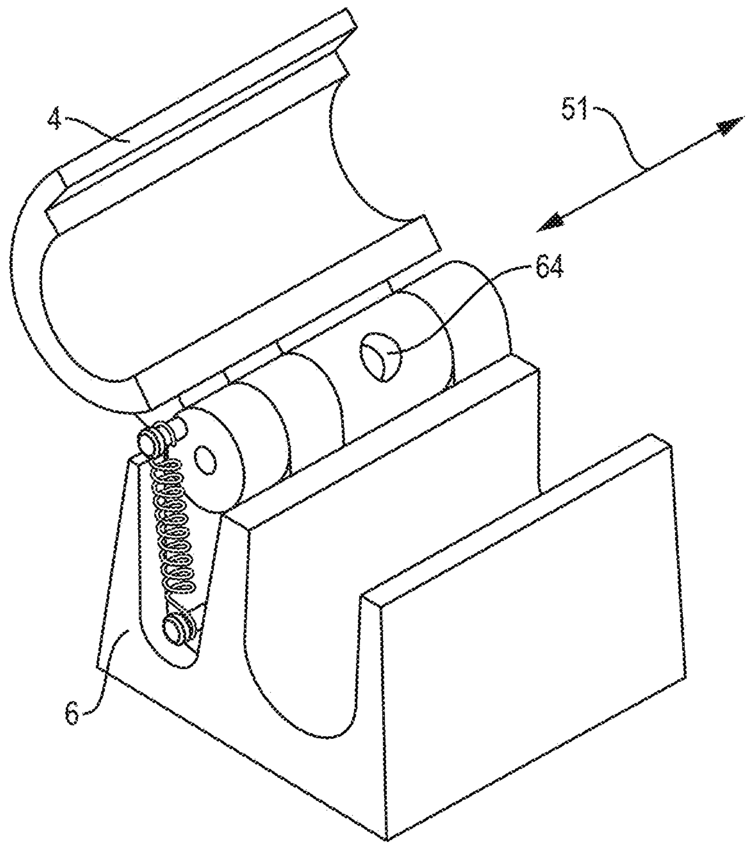
FIG. 2 (PRIOR ART)
FIG. 2 is a perspective view illustrating a prior art clamshell gunlock in an open position.
Figure 3:
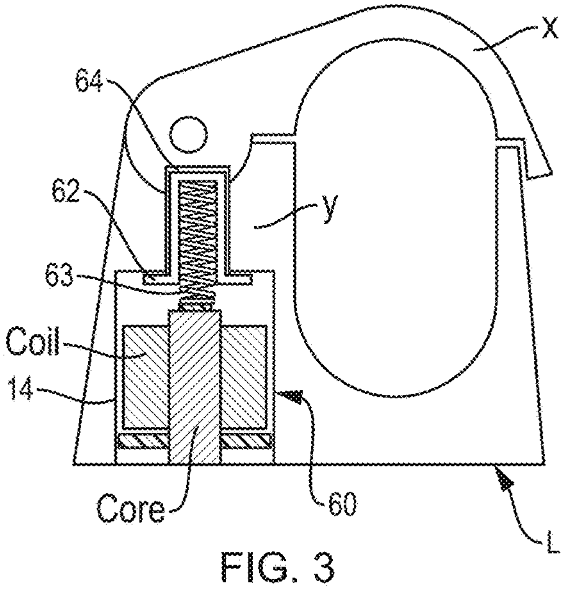
FIG. 3 (PRIOR ART)
FIG. 3 is a cross-sectional view of the prior art clamshell gunlock of FIG. 1 illustrating the solenoid and locking pin in the extended and locked position.
Figure 4:
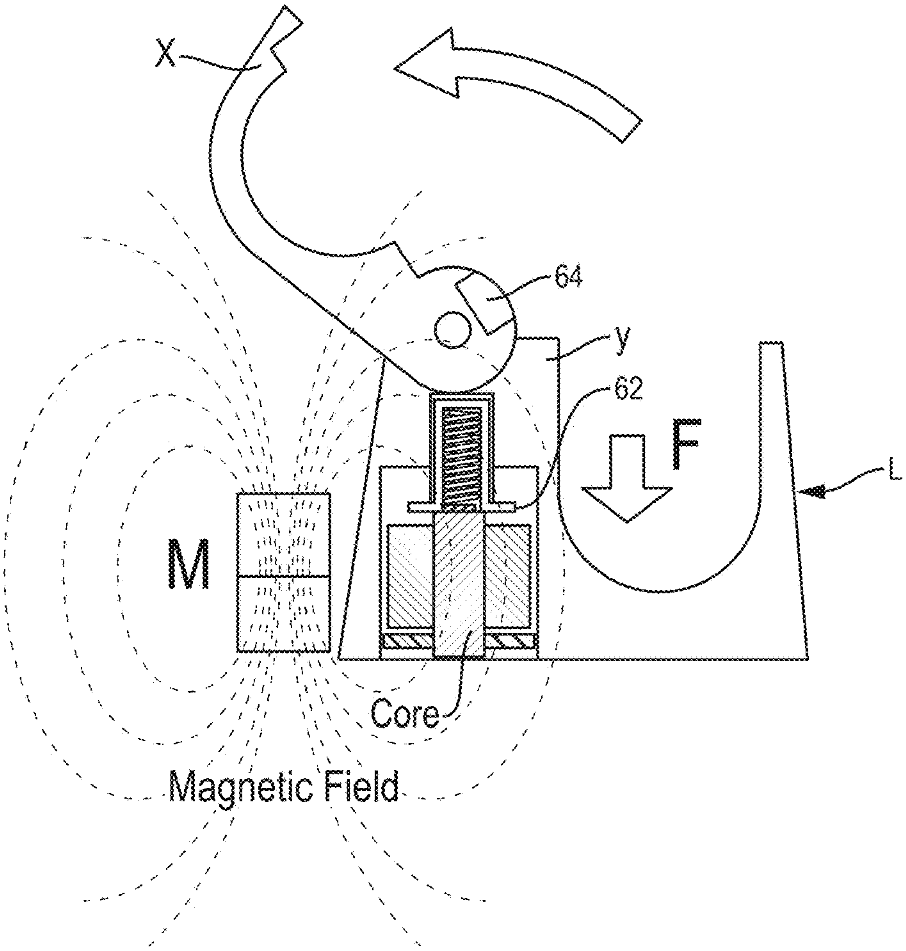
FIG. 4 (PRIOR ART)
FIG. 4 is a cross-sectional view of the prior art clamshell gunlock of FIG. 1 illustrating the solenoid and locking pin in a retracted and unlocked position caused by an external magnetic field from, for example, a magnet.

A clamshell gunlock 2 is typically held in a closed position by the clamshell gunlock's electro-mechanical locking mechanism 14, FIG. 3, including an electronically operated solenoid 60, which includes a spring 63 loaded magnetically conductive latch or pin 62, disposed in a normally extended position (as shown in FIG. 3), that engages with an opening 64 in the top portion 4 (see FIGS. 2 and 4).

Before operation, the gunlock 2 is securely mounted to an appropriate surface (in a mobile location such as a motor vehicle cabin or trunk or in a fixed location such as in a building or room) to prevent unauthorized removal of the firearm (not shown) secured in the gunlock 2. Such a surface might be any structurally secure surface where the firearm, tool or other object is to be secured, such as a police vehicle partition wall, trunk, dash of a vehicle, and the like. A number of mounting points (not shown) in the body portion 6 and appropriate mounting hardware (also not shown) may be provided (as well-known in the art) to mount the body portion 6.

In an exemplary embodiment, the clamshell gunlock's electro-mechanical locking mechanism 14 will automatically engage after a solid and precise connection has been made by the top portion 4 with the body portion 6 by virtue of the latch or pin 62 engaging with and into recess 64 in the lid or top portion 4 of the locking device 2. In this embodiment, during operation, the top portion 4 pivots at the hinge 32 towards the body portion 6. The protrusion along the lip 11 of the top portion 4 engages a corresponding channel of the body portion 6 when the gunlock is in operation in a closed position. The spring-loaded pin or latch 62 pushes upwardly into the opening 64 in the top portion 4, securing the gunlock in a locked position.

As known in the prior art, operating the locking mechanism 14 by electrically energizing the solenoid 60 to retract the solenoid locking pin 62 from engagement with the opening 64 in the top portion 4 quickly releases the connection between the body portion 6 and top portion 4 so that the top portion 4 may be pivoted upwardly apart from the body portion 6 (see FIGS. 2 and 4 for example) when access to the firearm locked in the gunlock 2 is desired. The locking mechanism 14 may be activated via a mechanical key override or electronically via a button or switch or the like which energizes the solenoid 60.

An electro-mechanical lock system 14 is used in multiple gunlocks and/or other locking systems as it enables the use of various recognition/activation systems for the activation, opening and control of the device by an authorized person. Examples of such systems which could be used include, but are not limited to concealed pushbutton switches, time delays, computer operated solutions, biometric scanning technologies, RFID readers, facial or voice recognition systems, and various other solutions for controlling electro mechanic devices.

As previously mentioned, an unexpected and unintended security weakness of these electro-mechanical lock systems was recently discovered. Specifically, if a strong enough magnet "M", FIG. 4 (a magnet, such as a rare earth magnet, or any other similarly designed magnetic field generator, such as a sufficiently strong electro-magnet), is passed underneath or adjacent that portion of a gunlock 2 utilizing the prior art electro-mechanical lock system 14, the material of the gunlock (typically aluminum or an iron ore composite) does not prevent transmission of the magnetic force of the magnet or other magnetic field generator to the solenoid (see FIG. 4).

Instead, the magnetic force generated by the magnetic field acts directly upon the solenoid 60, causing the solenoid to energize and retract the locking pin 62 from an engaging orifice 64 in an opposite component of the gunlock. Thus, the application of an external magnetic force proximate the solenoid activated gunlock (i.e., placing a magnet adjacent or against the locking device near the solenoid) enables unauthorized access to the 'securely' held firearm in the gunlock 2.

Figure 5:
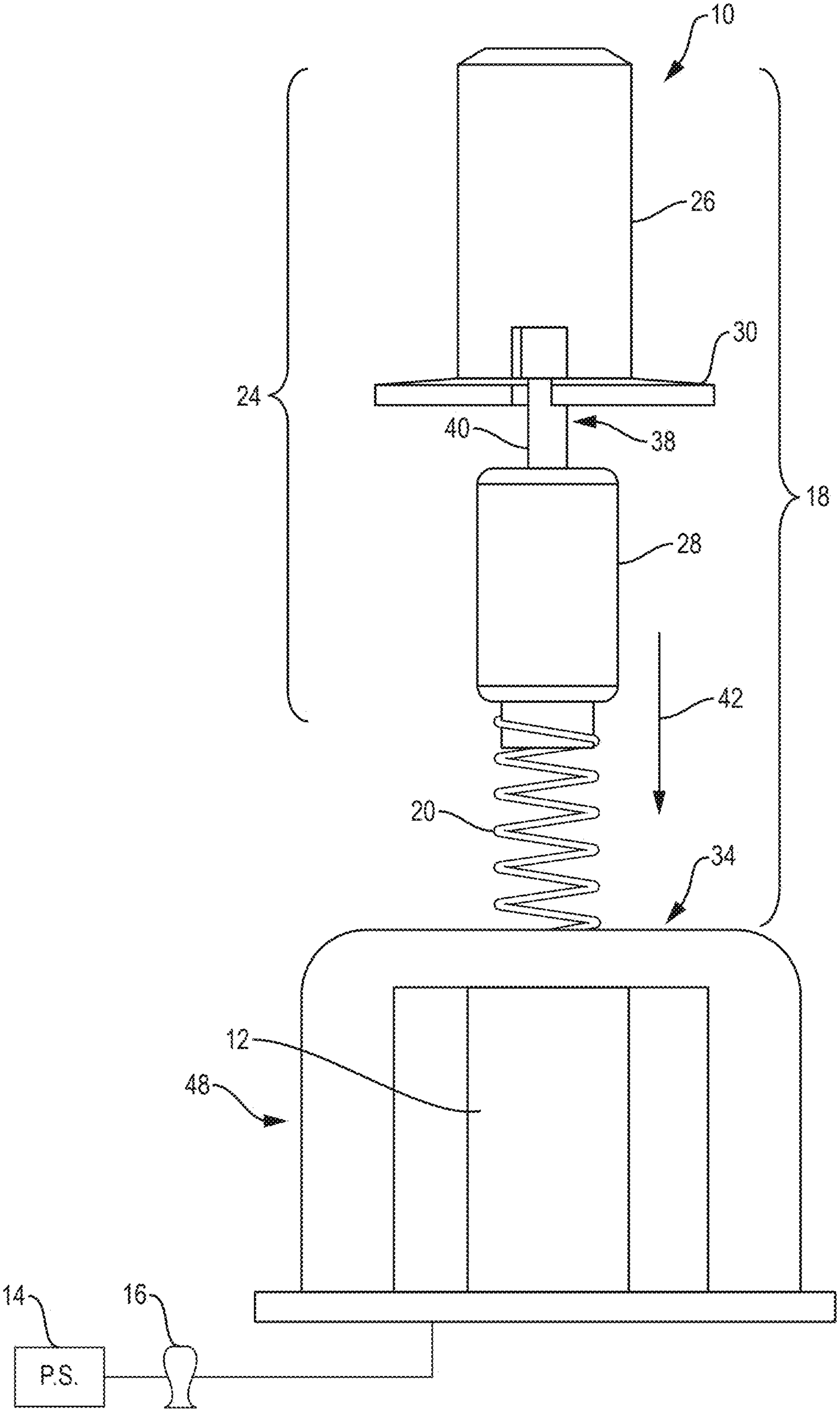
FIG. 5 is a side exploded view of the electromechanical locking mechanism, including a magnetic field resistant solenoid activated locking element according to the present invention.

The present invention features, in one embodiment, an electromechanical locking mechanism 10, FIG. 5, featuring a magnetic field resistant solenoid activated locking element, as will be described in greater detail below as well as a magnetically shielded solenoid, explained in greater detail in connection with FIG. 6.

The locking mechanism includes a solenoid 12 coupled to a source of electrical energy 14. The provision of electrical energy to the solenoid 12 is controlled by element 16, which is a manual or other controllable switch element.

Figure 6:
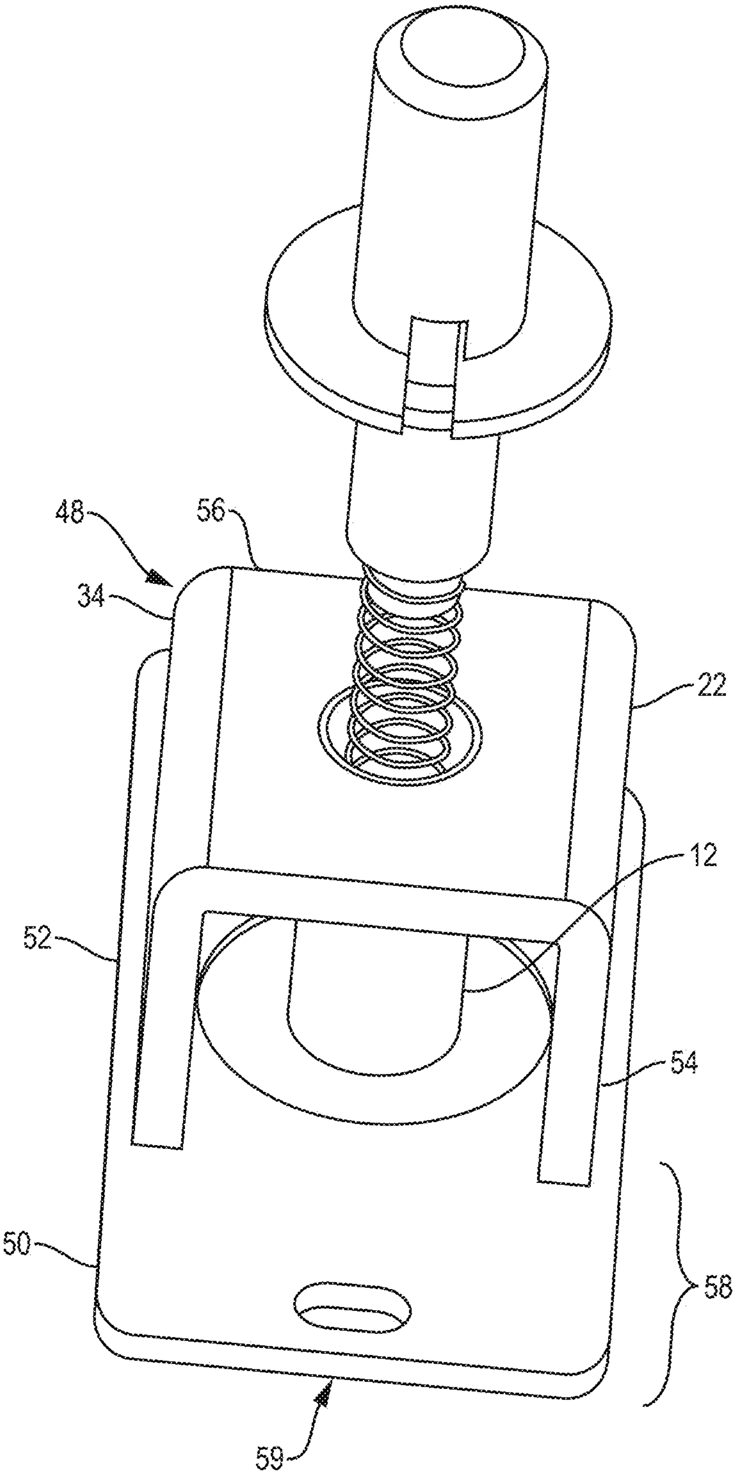
FIG. 6 is a top exploded perspective view of the magnetic field resistant solenoid activated locking element according to the present invention as well as the metal solenoid shield or enclosure.

The present invention features, in one embodiment, a magnetic field resistant solenoid activated locking element 18 including a spring, 20, configured for being disposed in a central opening 22, FIG. 6, in solenoid 12. The spring 20 has a predetermined diameter which is less than the predetermined diameter of the central cavity 22 in the solenoid 12.

The magnetic field resistant solenoid activated locking element 18 further includes a first locking element portion 26, configured for engaging with an opening (for example, opening 64, FIG. 3) in the locking device 2. The first locking element portion 26 is, in one embodiment, manufactured of a non-magnetically conductive material such as aluminum, plastic, fiber, reinforced plastic, composite material or the like having sufficient strength to serve in the capacity as engaging with opening 64 in the locking device 2. In another embodiment, the first locking element portion 26 may be manufactured from steel given the use of a solenoid shield discussed below.

The magnetic field resistant solenoid activating locking element 18 also includes a second locking element portion 28, mechanically coupled to the first locking element portion 26 and of an appropriate size (diameter and length) for being disposed in the central cavity 22 of the solenoid 12. The second locking element portion 28 is manufactured from a magnetically conductive or attractable material, such as steel, so as to be able to be pulled and acted upon by the solenoid 12.

Figure 7:
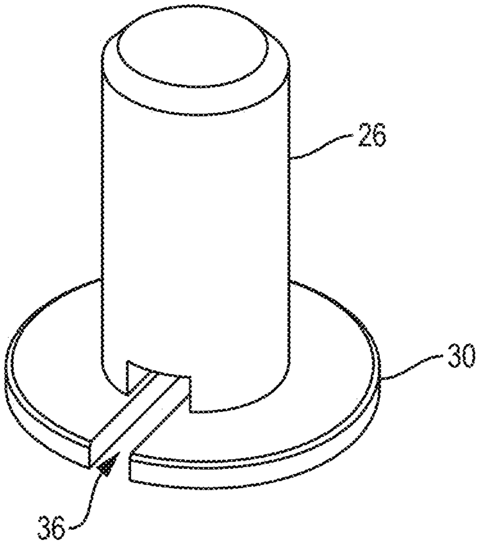
FIG. 7 is a perspective view of a first locking element portion of the magnetic field resistant solenoid activated locking element according to the present invention.
Figure 8:
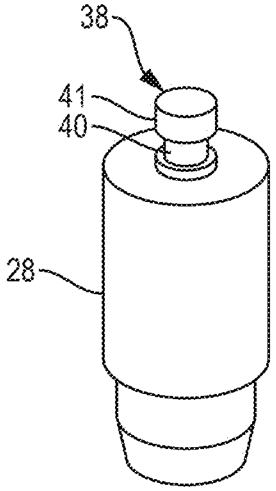
FIG. 8 is a perspective view of the second locking element portion of the magnetic field resistant solenoid activated locking element according to the present invention.
Figure 9:
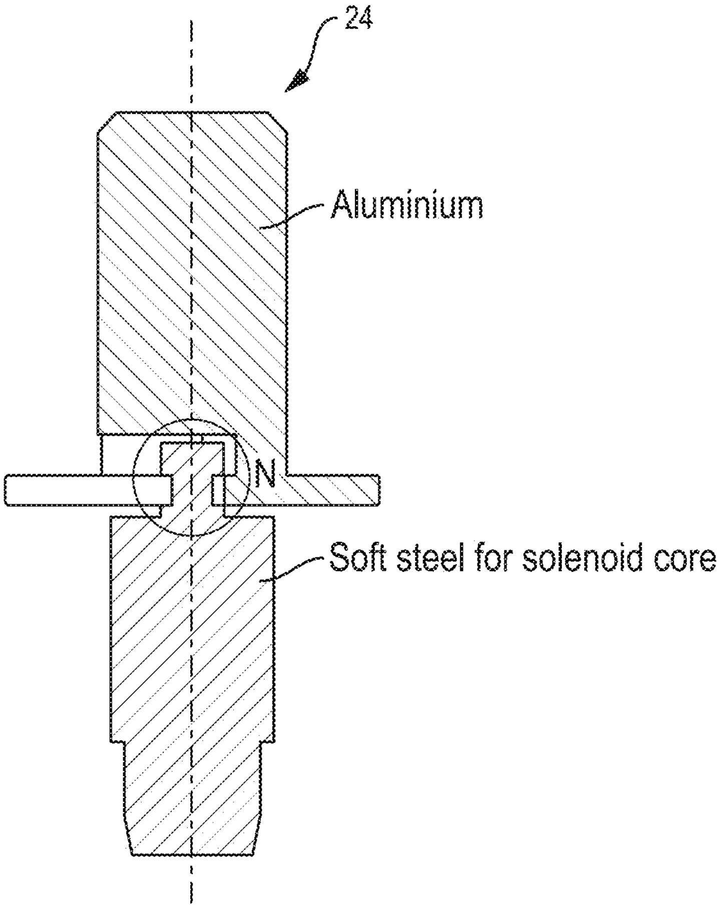
FIG. 9 is a side view of the assembled first and second locking element portions of the magnetic field resistant solenoid activated locking element according to the present invention.

The first locking element portion 26, features a flange 30 proximate one end of the element. The flange 30 is designed to sit against the top portion 34 of the metal enclosure 48 which surrounds solenoid 12 along at least two sides, top and bottom, when the electromechanical locking mechanism is energized. The flange 30 preferably includes a slot 36, FIG. 7, designed to accept a pin 38, FIG. 8 disposed on the second locking element portion 28. The pin 38 includes a shoulder region 40 having a smaller diameter than the pin head portion 41 and configured for engaging with slot 36 in the flange 30 of the first locking element portion 26 as shown in the assembled configuration in FIG. 9.

When the solenoid 12 is not energized (the locking mechanism is in the "locked" mode), the spring 20 pushing against the second locking element portion 28 forces the first locking element portion 26 into engagement in the hole or opening 64 in one portion of the locking device 2. When the solenoid 12 is activated and electrically energized, the magnetic field generated by the solenoid works on the second locking element portion 28 (which reacts to a magnetic field) pulling it downwardly as shown generally by arrow 42, which in turn pulls downwardly the first locking element 26 coupled to the second locking element 28. This action disengages the locking element 26 from opening 64 in the lock, allowing the lock to be opened as shown, for example, in FIGS. 2 and 4.

Another feature of the present invention is the provision of a metal solenoid enclosure 48, FIG. 6, which includes and is formed by a bottom plate 50, first and second side plates 52, 54 as well as top plate 56. The combination of the bottom plate, first and second side plates and top plate forms an electrical cage or enclosure or path for a magnetic field around the solenoid 12 effectively shielding the solenoid from a magnetic field which prevents any magnetic field from acting on the solenoid and causing the solenoid to retract the locking mechanism allowing access to a locked firearm or other device.

In one embodiment of the metal solenoid enclosure, the distance 58 between one edge 59 (an edge closest to the outside of the locking device) of the bottom plate 50 and the side plates 52, 54 is selected to be long enough to ensure that any magnetic field applied from this direction (from the edge 59) will not be strong enough to energize the solenoid 12. Such a solenoid enclosure essentially provides a magnetic field "shield" or "cage" around the solenoid 12 to prevent unintentional and unauthorized activation of the solenoid.

Accordingly, the present invention provides, in one embodiment, an electromechanical locking mechanism, including a magnetic field resistant solenoid activated locking element for a solenoid activated locking device, including a first locking element portion, configured for engaging with an opening in a locking device and manufactured of a non-magnetically conductive material, and a second locking element portion, mechanically coupled to the first locking element portion and configured for being disposed in a central cavity of a solenoid and manufactured of a magnetically conductive material, to prevent unintended and unintentional activation of the solenoid by unauthorized individuals and wherein such action might allow the locking device to be opened and unauthorized access to the gun, tool or other object stored therein.

In another embodiment, the present invention provides a metal solenoid enclosure which serves to protect the solenoid from exposure to a magnetic field of sufficient strength to activate the internal solenoid.

Although the present invention has been explained with regards to a clamshell gunlock, this is not a limitation of the present invention as the magnetic field resistant solenoid activated locking element for a solenoid activated locking device and a magnetic shield of the invention may be utilized in and with any type of gunlock or any type of other locking device which utilizes an appropriately energized electromechanical device such as a solenoid to provide access to the locking device or gunlock without departing from the spirit and scope of the present invention.

Modifications and substitutions by one of ordinary skill in the art are considered to be within the scope of the present invention, which is not to be limited except by the allowed claims and their legal equivalents.

What is claimed is:

1. An electromechanical locking mechanism, including a magnetic field resistant solenoid activated locking element, said electromechanical locking mechanism, comprising:

a solenoid, coupled to a source of electrical energy, and configured for electrically energizing said solenoid, said solenoid including a central cavity having a predetermined diameter and length;

a spring, sized and configured for being inserted into and disposed within said central cavity of said solenoid, said spring, having a predetermined diameter which is less than said predetermined diameter of said central cavity of said solenoid, and a length which is less than said predetermined length of said central cavity of said solenoid; and a magnetic field resistant solenoid activated locking element, said magnetic field resistant solenoid activated locking element comprising a first locking element portion, configured for engaging with an opening in a locking device and manufactured of a non-magnetically conductive material, and a second locking element portion, mechanically coupled to said first locking element portion and configured for being disposed in said central cavity of said solenoid abutting said spring, and manufactured of a magnetically conductive material.

2. The electromechanical locking mechanism of claim 1, wherein said source of electrical energy is interruptible.

3. The electromechanical locking mechanism of claim 2, wherein said solenoid is operable between an energized state when said source of electrical energy is not interrupted to said solenoid and a non-energized state when said source of electrical energy is interrupted to said solenoid.

4. The electromechanical locking mechanism of claim 3, wherein in said non-energized state, said spring is configured for pushing against said magnetic field resistant solenoid activated locking element forcing said first locking element portion to engage with said opening in said locking device.

5. The electromechanical locking mechanism of claim 3, wherein in said energized state, said solenoid creates an electrical field causing said second locking element portion to be pulled downwardly into said central cavity of said solenoid against said spring, causing said first locking element portion to become disengaged with said opening in said locking device.

6. The electromechanical locking mechanism of claim 1, wherein said electromechanical locking mechanism includes a magnetic shield around at least two sides and a top and bottom region of said solenoid.

7. The electromechanical locking device of claim 6, wherein said electromechanical locking device includes a metal solenoid enclosure comprising:

a bottom plate, at least first and second side plates, and a top plate, said bottom, top and at least first and second side plates configured for forming a magnetic field shield around said solenoid, for preventing an externally applied magnetic field from acting on the solenoid and causing the solenoid to move from one of said first or second position to the other of said first or second position, wherein said bottom plate includes a predetermined distance between one edge of said bottom plate closest to an outside region of a locking device wherein is disposed said solenoid and the at least first and second side and said top plate such that said predetermined distance wherein is disposed said solenoid and the at least first and second side and said top plate is selected to ensure that any magnetic field applied from proximate said outside region of said locking device proximate said one edge of said bottom plate will be insufficient to energize said solenoid causing the solenoid to move from one of said first or second position to the other of said first or second position preventing unintentional and unauthorized activation of the solenoid.

8. The electromechanical locking mechanism of claim 1, wherein said first locking element portion is manufactured of a non-magnetically conductive material selected from the group of materials consisting of aluminum, plastic, fiber reinforced plastic and composite materials.

9. The electromechanical locking mechanism of claim 1, wherein said second locking element portion is manufactured from steel.

10. The electromechanical locking mechanism of claim 1, wherein said first locking element portion includes a first end configured for engaging with said opening in said locking device, and a second end configured for engaging with said second locking element portion, wherein said second end of said first locking element portion includes a slot, and wherein said second locking element portion includes a pin disposed in a first end and configured for engaging with said slot in said second end of said first locking element portion.

11. The electromechanical locking mechanism of claim 10, wherein said second locking element portion includes a second end having a predetermined diameter which is less than the predetermined diameter of said spring and configured for engaging said second and of said second locking element portion with said spring.

12. The electromechanical locking mechanism of claim 1, wherein said locking device includes a gunlock.

13. The electromechanical locking device of claim 12, wherein said gunlock is a clamshell style gunlock.

14. The electromechanical locking device of claim 1, wherein said locking device includes a tool lock.

15. A metal solenoid enclosure, configured for providing an electromagnetic shield around a solenoid coupled to a source of energy, and selectively energizable from a first position to a second position, for preventing unintentional and unauthorized activation of the solenoid and a locking mechanism, coupled to and selectively activated by the solenoid, said locking mechanism configured for being moved from a first locked position to a second unlocked position, said metal solenoid enclosure comprising:

a bottom plate, at least first and second side plates, and a top plate, said bottom, top and at least first and second side plates configured for forming a magnetic field shield around said solenoid, for preventing an externally applied magnetic field from acting on the solenoid and causing the solenoid to move from one of said first or second position to the other of said first or second position.

16. The metal solenoid enclosure of claim 15, wherein said bottom plate includes a predetermined distance between one edge of said bottom plate closest to an outside region of a locking device wherein is disposed said solenoid and the at least first and second side and said top plate such that said predetermined distance wherein is disposed said solenoid and the at least first and second side and said top plate is selected to ensure that any magnetic field applied from proximate said outside region of said locking device proximate said one edge of said bottom plate will be insufficient to energize said solenoid causing the solenoid to move from one of said first or second position to the other of said first or second position preventing unintentional and unauthorized activation of the solenoid.

17. A solenoid activated locking device comprising:

a solenoid, coupled to a source of energy, and selectively energizable from a first position to a second position;

a locking mechanism, coupled to and selectively activated by said solenoid, said locking mechanism configured for being moved from a first locked position to a second unlocked position; and a metal solenoid enclosure, configured for providing an electromagnetic shield around said solenoid, said metal solenoid enclosure comprising a bottom plate, at least first and second side plates, and a top plate, said bottom, top and at least first and second side plates configured for forming a magnetic field shield around said solenoid, for preventing an externally applied magnetic field from acting on the solenoid and causing the solenoid to move from one of said first or second position to the other of said first or second position.

18. The solenoid activated locking device of claim 17, wherein said bottom plate includes a predetermined distance between one edge of said bottom plate closest to an outside region of a locking device wherein is disposed said solenoid and the at least first and second side and said top plate such that said predetermined distance wherein is disposed said solenoid and the at least first and second side and said top plate is selected to ensure that any magnetic field applied from proximate said outside region of said locking device proximate said one edge of said bottom plate will be insufficient to energize said solenoid causing the solenoid to move from one of said first or second position to the other of said first or second position preventing unintentional and unauthorized activation of the solenoid.

* * * * *